(12) United States Patent
Hoeppner et al.

(10) Patent No.: US 10,586,272 B2
(45) Date of Patent: *Mar. 10, 2020

(54) MANAGING PRODUCT ACQUISITION BASED ON PRODUCT CHARACTERISTICS

(71) Applicant: International Business Machines Corporation, Armonk, NY (US)

(72) Inventors: Trent Hoeppner, Beijing (CN); Leho Nigul, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 170 days.

This patent is subject to a terminal disclaimer.

(21) Appl. No.: 15/713,855

(22) Filed: Sep. 25, 2017

(65) Prior Publication Data

US 2019/0095982 A1    Mar. 28, 2019

(51) Int. Cl.
*G06Q 30/06* (2012.01)

(52) U.S. Cl.
CPC ..... *G06Q 30/0635* (2013.01); *G06Q 30/0603* (2013.01); *G06Q 30/0631* (2013.01); *G06Q 30/0601* (2013.01)

(58) Field of Classification Search
None
See application file for complete search history.

(56) References Cited

U.S. PATENT DOCUMENTS

| 9,208,494 B2 | 12/2015 | Cibor |
| 2003/0065578 A1 | 4/2003 | Peyrelevade et al. |
| 2003/0171944 A1 * | 9/2003 | Fine ........................ G06Q 30/06 705/2 |
| 2009/0119023 A1 | 5/2009 | Zimmer et al. |
| 2009/0299822 A1 | 12/2009 | Harari et al. |
| 2010/0145743 A1 | 6/2010 | Colquhoun |

(Continued)

FOREIGN PATENT DOCUMENTS

JP    2002215751 A    8/2002

OTHER PUBLICATIONS

Coles et al., "Ethical Consumers and e-Commerce: The Emergence and Growth of Fair Trade in the UK", Journal of Research for Consumers, Issue 10, 2006, 6 pages.

(Continued)

*Primary Examiner* — Nicholas D Rosen
(74) *Attorney, Agent, or Firm* — Yee & Associates, P.C.

(57) ABSTRACT

Managing product acquisition based on product characteristics is provided. Characteristics of a product in an electronic shopping cart are determined based on product provider data and product data corresponding to the product. A number of product characteristic points for the product in the electronic shopping cart is calculated based on mapping the determined characteristics of the product to user-defined product points. It is determined whether the calculated number of product characteristic points for the product in the shopping cart is less than or equal to a user-defined product characteristic point budget. In response to determining that the calculated number of product characteristic points for the product in the shopping cart is greater than the user-defined product characteristic point budget, a warning is displayed on a user client device that the user-defined product characteristic point budget is exceeded.

14 Claims, 5 Drawing Sheets

(56) References Cited

U.S. PATENT DOCUMENTS

| | | |
|---|---|---|
| 2010/0312668 A1 | 12/2010 | Notsani |
| 2013/0346232 A1 | 12/2013 | Ellison |
| 2014/0095192 A1* | 4/2014 | Rock .................. G06Q 30/0283 705/2 |
| 2015/0088642 A1* | 3/2015 | Mathew ............. G06Q 30/0633 705/14.51 |
| 2016/0196579 A1* | 7/2016 | Koura ................ G06Q 30/0255 705/14.53 |
| 2017/0098267 A1* | 4/2017 | Hokazono .......... G06Q 30/0627 |
| 2019/0095983 A1 | 3/2019 | Hoeppner et al. |

OTHER PUBLICATIONS

Sadeh et al., "Methodological Considerations of Researching Ethics in e-Commerce", 7th European Conference E-Comm-Line 2006, Sep. 2006, 8 pages.

List of IBM Patents and Applications Treated as Related, dated Aug. 13, 2019, 2 pages.

Office Action, dated Jul. 29, 2019, regarding U.S. Appl. No. 15/837,226, 21 pages.

\* cited by examiner

MANAGING PRODUCT ACQUISITION BASED ON PRODUCT CHARACTERISTICS

BACKGROUND

1. Field

The disclosure relates generally to e-commerce and more specifically to managing product acquisition based on characteristics corresponding to products for potential purchase by a client device user while e-commerce shopping.

2. Description of the Related Art

E-commerce is the ability of an enterprise to have an online presence which allows the enterprise to conduct its business electronically. In other words, an enterprise may sell products and receive customer payments all electronically online. Typically, e-commerce utilizes one or more electronic methods, which involve network computers and other types of data processing systems, such as, for example, desktop computers, tablet computers, and smart phones. In addition, e-commerce brings convenience to customers as the customers do not have to leave their homes, especially for products that are not sold in nearby stores.

Further, many enterprises are now advertising their products as ethical products, which include environmentally friendly, ecologically friendly (eco-friendly), nature-friendly, organic, and green products, that these enterprises are claiming reduce, minimize, or produce no harm to workers, consumers, ecosystems, or the environment. These enterprises promote these ethical products using additional product and product provider information and/or certifications, such as ecolabels.

SUMMARY

According to one illustrative embodiment, a computer system for managing product acquisition based on product characteristics is provided. The computer system determines characteristics of a product in an electronic shopping cart based on product provider data and product data corresponding to the product. The computer system calculates a number of product characteristic points for the product in the electronic shopping cart based on mapping the determined characteristics of the product to user-defined product points. The computer system determines whether the calculated number of product characteristic points for the product in the shopping cart is less than or equal to a user-defined product characteristic point budget. In response to the computer system determining that the calculated number of product characteristic points for the product in the shopping cart is greater than the user-defined product characteristic point budget, the computer system displays a warning on a user client device that the user-defined product characteristic point budget is exceeded. According to another illustrative embodiment, a computer program product for managing product acquisition based on product characteristics is provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
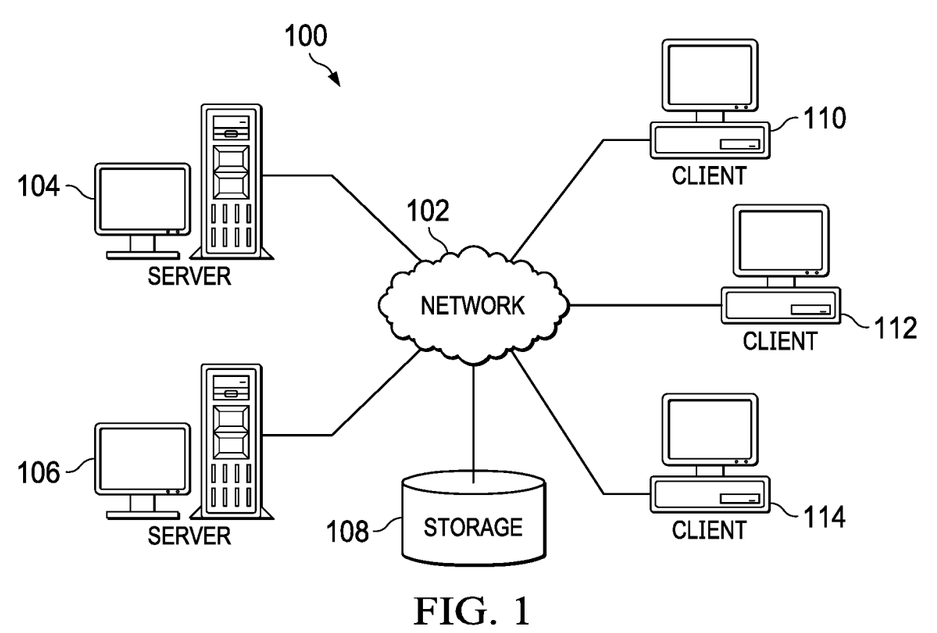
FIG. 1 is a pictorial representation of a network of data processing systems in which illustrative embodiments may be implemented.
Figure 2:
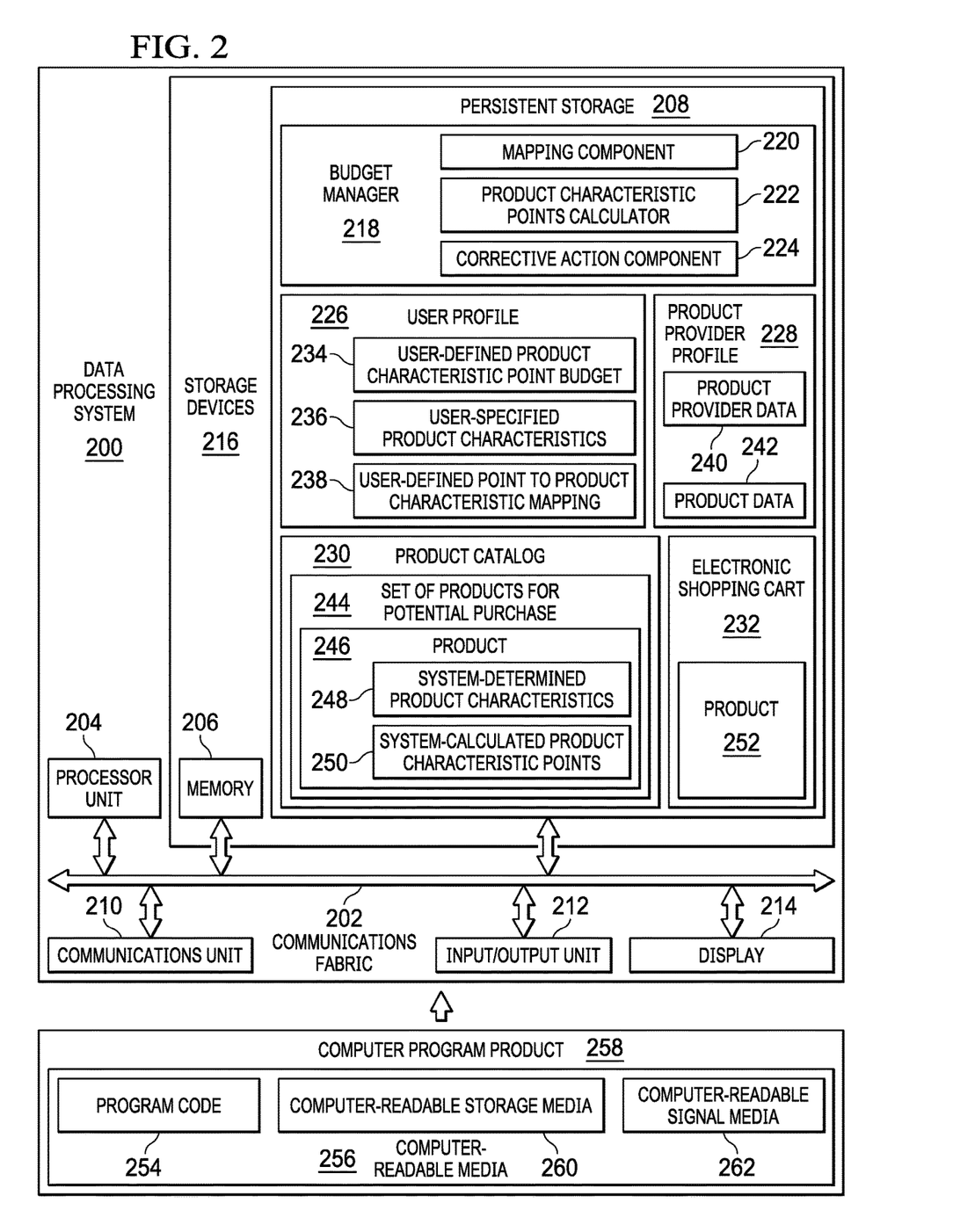
FIG. 2 is a diagram of a data processing system in which illustrative embodiments may be implemented.
Figure 3:
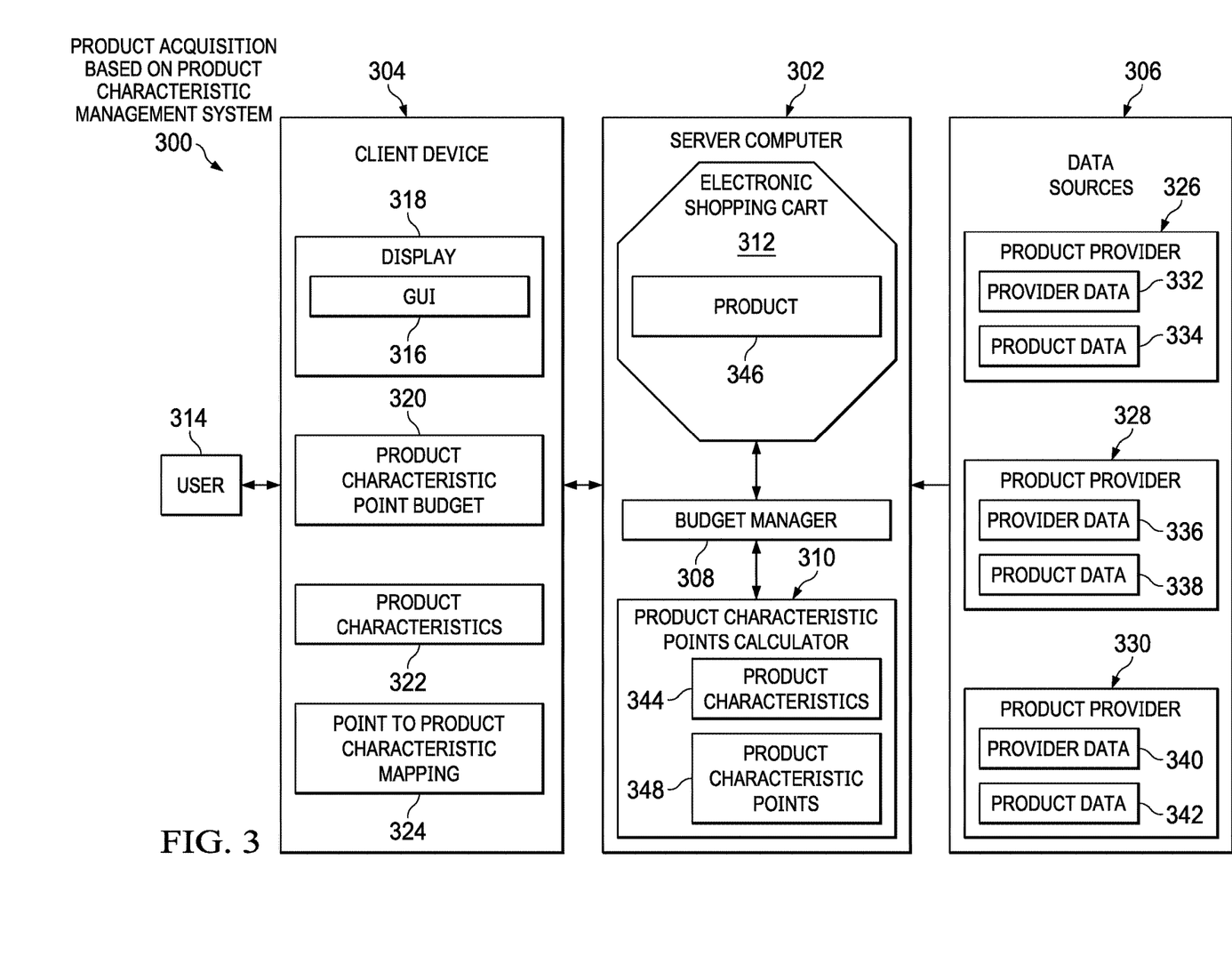
FIG. 3 is a diagram illustrating an example of a product acquisition based on product characteristic management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. Also, it should be noted that server 104 and server 106 may each represent a plurality of different servers. In this example, server 104 and server 106 provide ethical e-commerce shopping services corresponding to one or more enterprises that offer a plurality of products for sale in an electronic product catalog. The plurality of products in the electronic product catalog are provided to the one or more enterprises by one or more manufacturers, companies, producers, growers, and the like.

Ethical e-commerce means providing ethical products to customers. An ethical product may include, for example, products produced with ethical materials and/or according to ethical standards, which include products that do not involve animal testing, products that do not require extraction of non-renewable resources, products produced according to Fair Trade requirements, and products certified as ethical by an organization providing such certification. An ethical product also may include eco-friendly products, such as, for example, CFC free aerosol products, hybrid cars, free range eggs and poultry products, products from livestock not treated with antibiotics or hormones, pesticide-free produce, organic produce, and the like.

As a client device user selects a product from the electronic product catalog to be placed in an electronic shopping cart for purchase, server 104 or server 106 may, for example, calculate non-ethical points corresponding to non-ethical characteristics of the product selected for purchase by the client device user. As used herein, products include goods and/or services. In addition, server 104 or server 106 may compare the calculated non-ethical points corresponding to the selected product with a non-ethical product characteristic point budget defined by the client device user who selected the product for purchase.

If the calculated non-ethical points corresponding to the selected product are within the user-defined budget, then server 104 and/or server 106 successfully add the selected product to the electronic shopping cart. Alternatively, if the user-defined budget is exceeded, then server 104 and/or server 106 will display a warning in a graphical user interface of the user's client device and take one or more corrective actions, such as remove the selected product from the electronic shopping cart, delay purchase of the selected product, and/or offer one or more alternative products (i.e., products with a lower non-ethical product characteristic point score) from the electronic product catalog.

Thus, server 104 and server 106 allow a client device user to set ethical preferences for products that match the client device user's world view. In other words, server 104 and server 106 allow the client device user to support products that are in accord with the client device user's personal ethics.

Client 110, client 112, and client 114 also connect to network 102. Clients 110, 112, and 114 are clients of server 104 and server 106. In this example, clients 110, 112, and 114 are illustrated as desktop or personal computers with wire communication links to network 102. However, it should be noted that clients 110, 112, and 114 are meant as examples only. In other words, clients 110, 112, and 114 may include other types of data processing systems, such as, for example, laptop computers, handheld computers, smart phones, smart televisions, smart watches, kiosks, and the like, with wire or wireless communication links to network 102. Users of clients 110, 112, and 114 may utilize clients 110, 112, and 114 to access the non-ethical product characteristic point calculation services of server 104 and server 106 while e-commerce shopping.

Storage 108 is a network storage device capable of storing any type of data in a structured format or an unstructured format. In addition, storage 108 may represent a plurality of network storage devices. Storage 108 may store, for example, names and identifiers for a plurality of different client device users; names and identifiers for a plurality of different product providers; product provider data; product data; product catalogs; user-defined non-ethical product characteristic point budgets corresponding to each of the plurality of different client device users; user-specified non-ethical product characteristics corresponding to each of the plurality of different client device users; user-defined non-ethical point to non-ethical product characteristic mappings corresponding to each of the plurality of different client device users; and the like. Further, storage 108 may store other data, such as authentication or credential data that may include user names, passwords, and biometric data associated with the plurality of client device users and system administrators, for example.

In addition, it should be noted that network data processing system 100 may include any number of additional server computers, client devices, and other devices not shown. Program code located in network data processing system 100 may be stored on a computer readable storage medium and downloaded to a computer or data processing system for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores budget manager 218. Budget manager 218 calculates and controls the number of non-ethical product characteristic points a client device user is accumulating while e-commerce shopping based on a user-defined point budget for non-ethical product characteristics. It should be noted that even though budget manager 218 is illustrated as residing in persistent storage 208, in an alternative illustrative embodiment budget manager 218 may be a separate component of data processing system 200. For example, budget manager 218 may be a hardware component coupled to communication fabric 202 or a combination of hardware and software components. In another alternative illustrative embodiment, a first set of components of budget manager 218 may be located in data processing system 200 and a second set of one or more components of budget manager 218 may be located in a client device, such as client 110 in FIG. 1. In yet another alternative illustrative embodiment, components of budget manager 218 may be located in the client device instead of, or in addition to, data processing system 200.

In this example, budget manager 218 includes mapping component 220, product characteristic points calculator 222, and corrective action component 224. However, it should be noted that budget manager 218 may include more or fewer components than shown. For example, different illustrative embodiments may combine two or more components into one component, divide one component into two or more components, or add other components not shown.

Budget manager 218 utilizes mapping component 220 to map system-determined characteristics of a product selected for potential purchase to product characteristic points based on user-defined product characteristics and product point to product characteristic mappings defined by a user that selected the product for potential purchase. Budget manager 218 utilizes product characteristic points calculator 222 to calculate a number of product characteristic points for the selected product based on the mapping performed by mapping component 220. Budget manager 218 utilizes corrective action component 224 to perform one or more corrective actions in response to a calculated number of product characteristic points corresponding to the selected product exceeding a point budget defined by the user that selected the product for potential purchase.

In this example, persistent storage 208 also stores user profile 226, product provider profile 228, product catalog 230, and electronic shopping cart 232. However, it should be noted that user profile 226, product provider profile 228, product catalog 230, and electronic shopping cart 232 may each represent a plurality of different user profiles corresponding to a plurality of different client device users, a plurality of different product provider profiles corresponding to a plurality of different product providers that provide a plurality of different products, a plurality of different product catalogs corresponding to a plurality of different enterprises that provide different sets of products contained in the catalogs for sale, and a plurality of different electronic shopping carts corresponding to a plurality of different client device users selecting products from the plurality of catalogs for potential purchase.

In this example, user profile 226 includes user-defined product characteristic point budget 234, user-specified product characteristics 236, and user-defined point to product characteristic mapping 238. However, it should be noted that user profile 226 may include more or less information than illustrated. For example, user profile 226 may include user name and identification information, along with shopping preferences, payment preferences, and the like.

Budget manager 218 utilizes user-defined product characteristic point budget 234 to limit the number of non-ethical product characteristic points that the user corresponding to user profile 226 is willing to spend on a product or group of products while e-commerce shopping. The user may set user-defined product characteristic point budget 234 on a per product basis, on a per e-commerce shopping session basis, on a per day timer period basis, on a per week time period basis, on a per month time period basis, or on any other basis the user desires.

User-specified product characteristics 236 represent a set of product characteristics that the user corresponding to user profile 226 identifies as non-ethical product characteristics, such as, for example, child labor and unfair trade practices to produce a product. User-defined point to product characteristic mapping 238 represents a mapping between non-ethical product characteristic points defined by the user corresponding to user profile 226 and various characteristics in user-specified product characteristics 236. Budget manager 218 calculates points for a selected product for potential purchase based on user-specified product characteristics 236 and user-defined point to product characteristic mapping 238.

In this example, product provider profile 228 includes product provider data 240 and product data 242. However, it should be noted that product provider profile 228 may include more or less information than shown. For example, product provider profile 228 also may include product provider name and identification information.

Product provider data 240 represent information regarding the product provider, such as use of child labor, worker wages, resources used to produce products, trade practices, types of products produced, and the like. Product data 242 represent information regarding each of the different types of products produced by the product provider corresponding to provider data 240. Product data 242 may include, for example, composition or ingredients of each of the different types of products. Budget manager utilizes product provider data 240 and product data 242 to determine characteristics corresponding to each of the different types of products, such as system-determined product characteristics 248, and calculate product characteristic points for each of the different types of products, such as system-calculated product characteristic points 250.

Product catalog 230 includes set of products for potential purchase 244. A client device user selects product 246 to be placed in electronic shopping cart 232 from set of products for potential purchase 244. Budget manager 218 determines system-determined product characteristics 248 corresponding to product 246. In addition, budget manager 218 calculates system-calculated product characteristic points 250 for product 246 based on system-determined product characteristics 248 corresponding to product 246 and user-defined point to product characteristic mapping 238. Further, budget manager 218 compares system-calculated product characteristic points 250 corresponding to product 246 with user-defined product characteristic point budget 234.

If budget manager 218 determines that system-calculated product characteristic points 250 is less than or equal to user-defined product characteristic point budget 234, then budget manager 218 adds product 246, which is illustrated as product 252, to electronic shopping cart 232. If budget manager 218 determines that system-calculated product characteristic points 250 is greater than user-defined product characteristic point budget 234, then budget manager 218 displays a graphical user interface warning to the client device user indicating that system-calculated product characteristic points 250 have exceeded user-defined product characteristic point budget 234. Furthermore, budget manager 218 may automatically take one or more corrective actions regarding system-calculated product characteristic points 250 exceeding user-defined product characteristic point budget 234. For example, budget manager 218 may cancel the transaction related to product 252 or delay purchase of product 252 to a next or subsequent budget time period.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keyboard, keypad, and/or some other suitable input device. Display 214 provides a mechanism to display information to a user. Display 214 also may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 254 is located in a functional form on computer readable media 256 that is selectively removable and may be loaded onto or transferred to data processing system 200 for running by processor unit 204. Program code 254 and computer readable media 256 form computer program product 258. In one example, computer readable media 256 may be computer readable storage media 260 or computer readable signal media 262. Computer readable storage media 260 may include, for example, an optical or magnetic disc that is inserted or placed into a drive or other device that is part of persistent storage 208 for transfer onto a storage device, such as a hard drive, that is part of persistent storage 208. Computer readable storage media 260 also may take the form of a persistent storage, such as a hard drive, a thumb drive, or a flash memory that is connected to data processing system 200. In some instances, computer readable storage media 260 may not be removable from data processing system 200.

Alternatively, program code 254 may be transferred to data processing system 200 using computer readable signal media 262. Computer readable signal media 262 may be, for example, a propagated data signal containing program code 254. For example, computer readable signal media 262 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 254 may be downloaded over a network to persistent storage 208 from another device or data processing system through computer readable signal media 262 for use within data processing system 200. For instance, program code stored in a computer readable storage media in a data processing system may be downloaded over a network from the data processing system to data processing system 200. The data processing system providing program code 254 may be a server computer, a client computer, or some other device capable of storing and transmitting program code 254.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 260 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that a growing number of e-commerce shoppers want to limit their purchases to products that were produced using ethical means. For example, product characteristics, such as $CO_2$ footprint, child labor usage, fair wage practice, and the like, are important for many e-commerce shoppers while making product purchasing decisions. For such e-commerce shoppers, it is important to these e-commerce shoppers to understand how much, if any, their purchasing decisions are contributing to non-ethical business practices and products.

While many e-commerce websites currently exist claiming to sell only ethical products, these e-commerce websites don't provide a shopper with an ability to define an acceptable "budget" for purchasing products that may have one or more non-ethical characteristics associated with one or more of the products. As an example, take e-commerce shopper, Agnes, who considers herself to be a conscientious, ethical, and eco-friendly product purchaser. As a result, Agnes would like to only purchase products that align with her world view. However, Agnes also is a realist, which means that she understands not every product is produced with only ethical characteristics, such as, for example, with a zero $CO_2$ footprint or with fair worker wages.

Consequently, Agnes would like to define a "non-ethical product characteristic point budget" for product purchases while e-commerce shopping. The non-ethical product characteristic point budget sets a limit on how many non-ethical product characteristic points Agnes is willing to include in product purchases while e-commerce shopping. Agnes may set the non-ethical product characteristic point budget on a per product basis, on a per e-commerce shopping session basis, on a per day basis, on a per week basis, on a per month basis, or any combination thereof. This user-defined budget also may include user-configurable mappings between non-ethical points and various non-ethical product characteristics. For example, Agnes may define one non-ethical point as equaling one hour of child labor to produce a product or one ton of $CO_2$ emissions to product a product. In other words, user-defined non-ethical points are an aggregated abstraction view corresponding to user-specified non-ethical product characteristics.

After Agnes defines her non-ethical product characteristic point budget, illustrative embodiments gauge all of Agnes' e-commerce shopping purchases against her user-defined budget. For example, if Agnes selects a product to be added to an electronic shopping cart and illustrative embodiments determine that the product's calculated non-ethical characteristic point score is within her user-defined budget, then illustrative embodiments add the product to the electronic shopping cart. Alternatively, if illustrative embodiments determine that the selected product's calculated non-ethical characteristic point score exceeds the user-defined non-ethical point budget, then illustrative embodiments take one or more corrective actions. Corrective action may include, for example, notifying Agnes regarding the selected product exceeding the non-ethical point budget, terminating checkout of the electronic shopping cart, presenting one or more ethical alternative products having lower non-ethical point scores, canceling or postponing purchase of the selected product to a later budget time period when illustrative embodiments determine or predict that the non-ethical point budget will not be exceeded.

To enable this non-ethical point calculation by illustrative embodiments, illustrative embodiments receive data from a plurality of data sources. The plurality of data sources are product providers, such as, for example, companies, producers, growers, manufacturers, and the like. The data received from the product producers include information regarding each product producer, such as, for example, child labor information, non-renewable resources used to produce products, $CO_2$ emissions corresponding to product production, and the like, and information regarding each product produced, such as, for example, ingredients or composition of a product, biodegradability of a product, environmental toxicity of a spent product, animal testing, and the like.

Thus, illustrative embodiments provide Agnes with a capability to define her own non-ethical product characteristic point budget for potential product purchases. In other words, illustrative embodiments enable Agnes to limit her product purchases within her set budget for non-ethical product characteristics. In addition, it should be noted that illustrative embodiments are not limited to a single person, but also may include groups of people (e.g., family budget, company budget for B2B scenarios, and the like).

With reference now to FIG. 3, a diagram illustrating an example of a product acquisition based on product characteristic management system is depicted in accordance with an illustrative embodiment. Product acquisition based on product characteristic management system 300 is a system of software and hardware components for managing product acquisition based on characteristics corresponding to products for potential purchase by a customer while e-commerce shopping. Product acquisition based on product characteristic management system 300 may be implemented in a network of data processing systems, such as network data processing system 100 in FIG. 1.

In this example, product acquisition based on product characteristic management system 300 includes server computer 302, client device 304, and data sources 306. However, it should be noted that product acquisition based on product characteristic management system 300 is only meant as an example and not as a limitation on illustrative embodiments. In other words, product acquisition based on product characteristic management system 300 may include any number of server computers, client devices, data sources, and other devices not shown.

Server computer 302 may be, for example, server 104 in FIG. 1 or data processing system 200 in FIG. 2. In this example, server computer 302 includes budget manager 308, product characteristic points calculator 310 and electronic shopping cart 312, such as budget manager 218, product characteristic points calculator 222, and electronic shopping cart 232 in FIG. 2.

User 314 interacts with client device 304. Client device 304 may be, for example, client 110 in FIG. 1. User 314 utilizes graphical user interface (GUI) 316 in display 318 of client device 304 to define product characteristic point budget 320, specify product characteristics 322, and define point to product characteristic mapping 324. Product characteristic point budget 320, product characteristics 322, and point to product characteristic mapping 324 may be, for example, user-defined product characteristic point budget 234, user-specified product characteristics 236, and user-defined point to product characteristic mapping 238 in FIG. 2. User 314 sends product characteristic point budget 320, product characteristics 322, and point to product characteristic mapping 324 to budget manager 308 of computer server 302 for future reference when user 314 is e-commerce shopping.

Data sources 306 include product provider 326, product provider 328, and product provider 330. Product provider 326, product provider 328, and product provider 330 each provide a set of products to an enterprise corresponding to server computer 302. The enterprise organizes the different sets of products provided by product provider 326, product provider 328, and product provider 330 into an electronic catalog for sale. In addition, product provider 326 sends provider data 332 and product data 334 to budget manager 308 of server computer 302 for future reference. Similarly, product provider 328 sends provider data 336 and product data 338 and product provider 330 sends provider data 340 and product data 342 to budget manager 308. Provider data 332, 336, and 340 may be, for example, product provider data 240 in FIG. 2, which may be located in different product provider profiles corresponding to respective product providers 326, 328, and 330. Similarly, product data 334, 338, and 342 may be, for example, product data 242 in FIG. 2, which may be located in the different product provider profiles corresponding to respective product providers 326, 328, and 330. Budget manager 308 utilizes product characteristic points calculator 310 to generate products characteristics 344 for products provided by product providers 326, 328, and 330 based on provider data 332, product data 334, provider data 336, product data 338, provider data 340, and product data 342.

User 314 utilizes GUI 316 to select product 346 from the electronic catalog to be added to electronic shopping cart 312. After receiving an indication that user 314 wants to add product 346 to electronic shopping cart 312, budget manager 308 calculates product characteristic points 348 for product 346 based on product characteristics 344 corresponding to product 346 generated by product characteristic points calculator 310 and on point to product characteristic mapping 324 received from user 314 via client device 304. Further, budget manager 308 compares product characteristic points 348 corresponding to product 346 with product characteristic point budget 320 to determine whether product characteristic points 348 for product 346 exceed product characteristic point budget 320.

If budget manager 308 determines that product characteristic points 348 for product 346 do not exceed product characteristic point budget 320, then budget manager 308 adds product 346 to electronic shopping cart 312. Alternatively, if budget manager 308 determines that product characteristic points 348 for product 346 exceed product characteristic point budget 320, then budget manager 308 displays a warning to user 314 in GUI 316 indicating that product characteristic points 348 for product 346 exceed product characteristic point budget 320. Thus, GUI 316 improves the speed and accuracy with which user 314 can perform the e-commerce task of purchasing one or more products within a product characteristic point budget defined by user 314. In addition, budget manager 308 automatically performs one or more corrective actions, such as, for example, prevent product 346 from being added to electronic shopping cart 312 and/or canceling the transaction corresponding to electronic shopping cart 312.

Figure 4A:
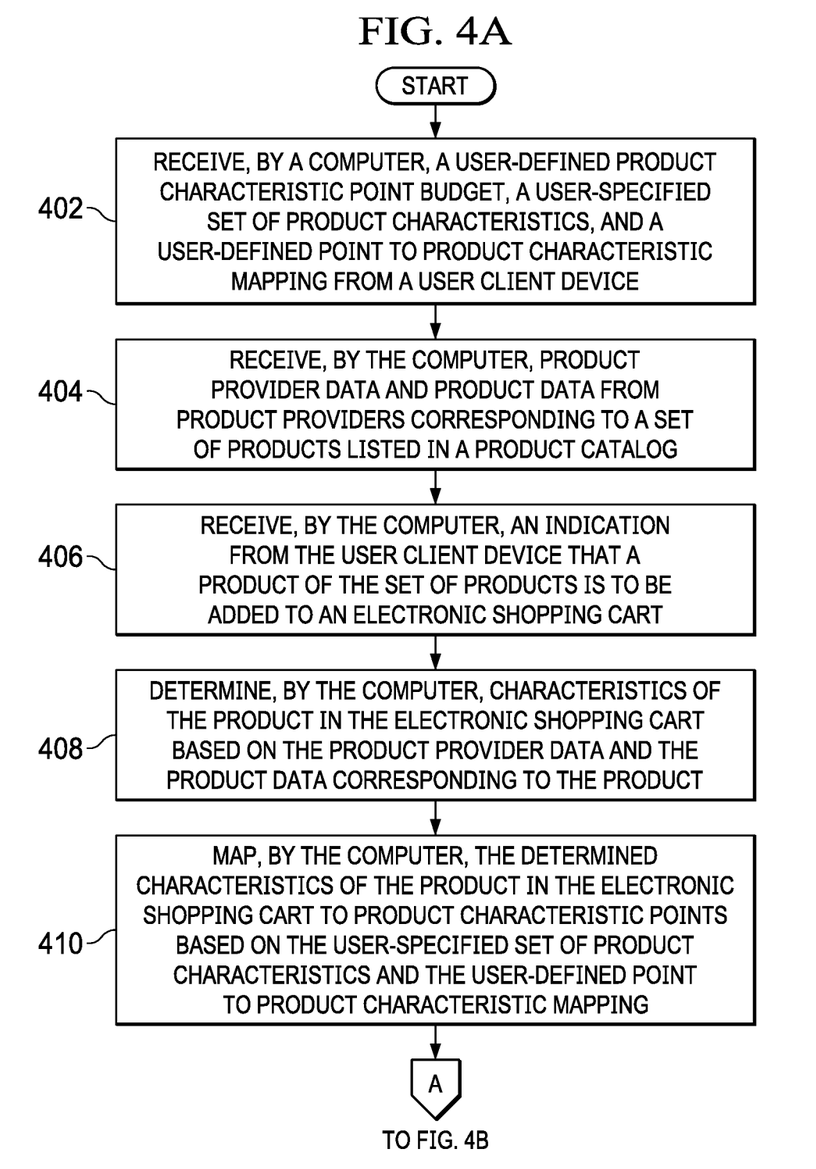
FIGS. 4A-4B are a flowchart illustrating a process for managing product acquisition based on product characteristics in accordance with an illustrative embodiment.
Figure 4B:
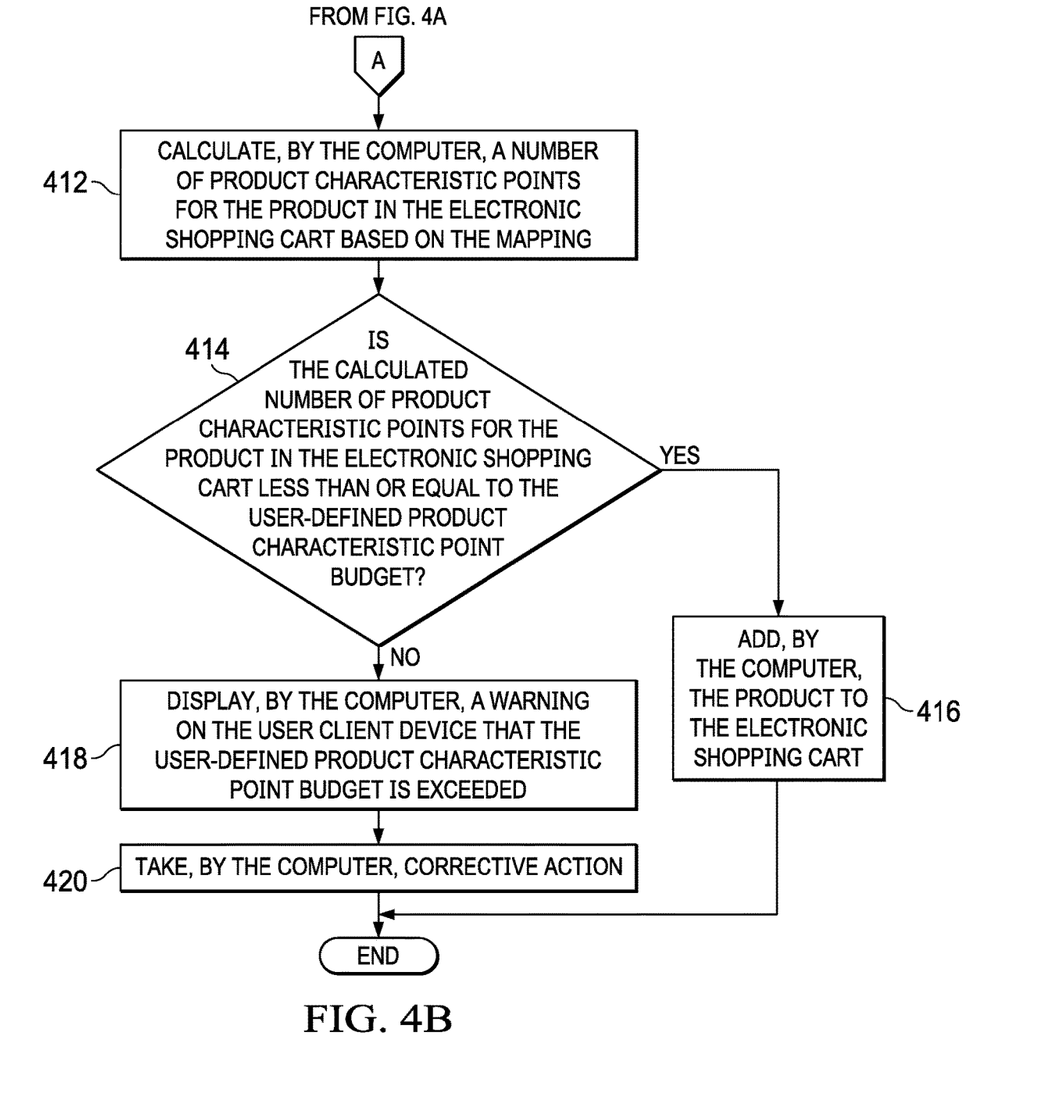

With reference now to FIGS. 4A-4B, a flowchart illustrating a process for managing product acquisition based on product characteristics is shown in accordance with an illustrative embodiment. The process shown in FIGS. 4A-4B may be implemented in a computer, such as, for example, server 104 in FIG. 1, data processing system 200 in FIG. 2, or server computer 302 in FIG. 3.

The process begins when the computer receives a user-defined product characteristic point budget, a user-specified set of product characteristics, and a user-defined point to product characteristic mapping from a user client device (step 402). In addition, the computer receives product provider data and product data from product providers corresponding to a set of products listed in a product catalog (step 404).

Subsequently, the computer receives an indication from the user client device that a product of the set of products is to be added to an electronic shopping cart (step 406). The computer determines characteristics of the product in the electronic shopping cart based on the product provider data and the product data corresponding to the product (step 408). Further, the computer maps the determined characteristics of the product in the electronic shopping cart to product characteristic points based on the user-specified set of product characteristics and the user-defined point to product characteristic mapping (step 410).

Afterward, the computer calculates a number of product characteristic points for the product in the electronic shopping cart based on the mapping (step 412). Subsequently, the computer makes a determination as to whether the calculated number of product characteristic points for the product in the electronic shopping cart is less than or equal to the user-defined product characteristic point budget (step 414). If the computer determines that the calculated number of product characteristic points for the product in the electronic shopping cart is less than or equal to the user-defined product characteristic point budget, yes output of step 414, then the computer adds the product to the electronic shopping cart (step 416). Thereafter, the process terminates.

If the computer determines that the calculated number of product characteristic points for the product in the electronic shopping cart is greater than the user-defined product characteristic point budget, no output of step 414, then the computer displays a warning on the user client device that the user-defined product characteristic point budget is exceeded (step 418). Further, the computer takes corrective action (step 420). Thereafter, the process terminates.

Thus, illustrative embodiments of the present invention provide a computer-implemented method, computer system, and computer program product for managing product acquisition based on characteristics corresponding to products for potential purchase by a user while e-commerce shopping. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for managing product acquisition of a product based on product characteristics of the product, the computer system comprising:
a bus system;
a storage device connected to the bus system, wherein the storage device stores program instructions; and
a processor connected to the bus system, wherein the processor executes the program instructions to:
receive via a network product provider data and product data corresponding to the product from a product provider that provided the product for inclusion in an electronic product catalog;
receive an indication from a user of a user client device that the product is to be added to an electronic shopping cart;
determine characteristics of the product based on the product provider data and the product data corresponding to the product responsive to receiving the indication from the user;
map the determined characteristics of the product to product characteristic points based on a user-specified set of product characteristics and a product point to product characteristic mapping;
calculate a number of the product characteristic points for the product based on the mapping of the determined characteristics of the product to the product characteristic points;
determine whether the calculated number of the product characteristic points for the product is less than or equal to a user-defined product characteristic point budget; and
display a warning on the user client device that the user-defined product characteristic point budget is exceeded in response to determining that the calculated number of the product characteristic points for the product is greater than the user-defined product characteristic point budget.

2. The computer system of claim 1, wherein the processor further executes the program instructions to:
take corrective action based on the calculated number of the product characteristic points for the product exceeding the user-defined product characteristic point budget.

3. The computer system of claim 2, wherein the corrective action is at least one of removing the product from the electronic shopping cart, delaying purchase of the product to a next budget time period, and offering one or more alternative products having a lower number of the product characteristic points from the electronic product catalog.

4. The computer system of claim 2, wherein the corrective action is terminating checkout of the electronic shopping cart.

5. The computer system of claim 1, wherein the processor further executes the program instructions to:
add the product to the electronic shopping cart in response to determining that the calculated number of the product characteristic points for the product is less than or equal to the user-defined product characteristic point budget.

6. The computer system of claim 1 wherein the processor further executes the program instructions to:
receive the user-defined product characteristic point budget, the user-specified set of product characteristics, and the product point to product characteristic mapping from the user client device.

7. The computer system of claim 6, wherein the product point to product characteristic mapping is a user-defined product point to product characteristic mapping, and wherein the user-specified product characteristics, the user-defined product characteristic point budget, and the user-defined product point to product characteristic mapping are maintained in a user profile of the user.

8. A computer program product for managing product acquisition of a product based on product characteristics of the product, the computer program product comprising a computer readable storage medium having program instructions embodied therewith, the program instructions executable by a computer to cause the computer to perform a method comprising:
receiving, by the computer via a network, product provider data and product data corresponding to the product from a product provider that provided the product for inclusion in an electronic product catalog;
receiving, by the computer, an indication from a user of a user client device that the product is to be added to an electronic shopping cart;
determining, by the computer responsive to receiving the indication from the user, characteristics of the product based on the product provider data and the product data corresponding to the product;
mapping, by the computer, the determined characteristics of the product to product characteristic points based on a user-specified set of product characteristics and a product point to product characteristic mapping;
calculating, by the computer, a number of the product characteristic points for the product based on the mapping of the determined characteristics of the product to the product characteristic points;
determining, by the computer, whether the calculated number of the product characteristic points for the product is less than or equal to a user-defined product characteristic point budget; and
responsive to the computer determining that the calculated number of the product characteristic points for the product is greater than the user-defined product characteristic point budget, displaying, by the computer, a warning on the user client device that the user-defined product characteristic point budget is exceeded.

9. The computer program product of claim 8 further comprising:
taking, by the computer, corrective action based on the calculated number of the characteristic points for the product exceeding the user-defined product characteristic point budget.

10. The computer program product of claim 9, wherein the corrective action is at least one of removing the product from the electronic shopping cart, delaying purchase of the product to a next budget time period, and offering one or more alternative products having a lower number of the product characteristic points from the electronic product catalog.

11. The computer program product of claim 9, wherein the corrective action is terminating checkout of the electronic shopping cart.

12. The computer program product of claim 8 further comprising:
responsive to the computer determining that the calculated number of the product characteristic points for the product is less than or equal to the user-defined product characteristic point budget, adding, by the computer, the product to the electronic shopping cart.

13. The computer program product of claim 8 further comprising:
receiving, by the computer, the user-defined product characteristic point budget, the user-specified set of product characteristics, and a user-defined product point to product characteristic mapping from the user client device.

14. The computer program product of claim 13, wherein the product point to product characteristic mapping is a user-defined product point to product characteristic mapping, and wherein the user-specified product characteristics, the user-defined product characteristic point budget, and the user-defined product point to product characteristic mapping are maintained in a user profile of the user.

* * * * *